United States Patent [19]

Williams

[11] Patent Number: 4,756,644
[45] Date of Patent: Jul. 12, 1988

[54] REROUNDING APPARATUS

[76] Inventor: Richard L. Williams, 9180 Parker Rd., Harrod, Ohio 45850

[21] Appl. No.: 50,092

[22] Filed: May 14, 1987

[51] Int. Cl.$^4$ .......................... F16L 1/00; F16L 55/18
[52] U.S. Cl. ...................................... 405/154; 138/97; 405/156
[58] Field of Search ............... 405/154, 156, 182, 184; 29/234; 72/370; 138/97; 166/207, 249, 277; 175/55

[56] References Cited

U.S. PATENT DOCUMENTS

| Re. 23,381 | 6/1951 | Bodine, Jr. | 166/249 |
|---|---|---|---|
| 2,184,809 | 5/1939 | Brammer | 166/249 |
| 2,229,912 | 1/1941 | Baily . | |
| 2,522,171 | 9/1950 | Furman et al. . | |
| 2,601,248 | 6/1952 | Brenholdt . | |
| 3,113,621 | 4/1960 | Krueger et al. | 166/249 |
| 3,123,101 | 7/1962 | Blount et al. | 138/97 |
| 3,294,121 | 12/1966 | Powell et al. | 138/97 |
| 3,543,377 | 11/1968 | Bremner | 29/234 |
| 3,602,263 | 8/1971 | Bremner | 138/97 |
| 4,309,128 | 1/1982 | Williams | 405/154 |
| 4,457,647 | 7/1984 | Dusette et al. | 405/154 |
| 4,648,746 | 3/1987 | Abinett | 405/184 |
| 4,674,914 | 6/1987 | Wayman et al. | 405/154 |

Primary Examiner—David H. Corbin
Attorney, Agent, or Firm—Jeffers, Hoffman & Niewyk

[57] ABSTRACT

An apparatus for rerounding flexible deflected pipe and having a housing of slightly smaller outside diameter than the inside diameter of a pipe to be rerounded. The apparatus includes a plurality of bearings in which a crankshaft is journalled. The crankshaft supports an eccentrically mounted weight for generating vibrations in the crankshaft when the crankshaft is rotated. An air motor drives the crankshaft. The crankshaft includes a central bore and radial passages for equalizing air pressure across the bearings. Flanges are secured in heat conducting relationship with both the bearings and with the housing to conduct heat away from the bearings, thereby cooling the bearings. One of the flanges includes apertures for conducting air which is expelled from the air motor, thereby cooling the flange and the bearings.

20 Claims, 3 Drawing Sheets

REROUNDING APPARATUS

BACKGROUND OF THE INVENTION

This invention relates to an apparatus for rerounding deflected sewer, water or other pipes in situ and particularly relates to an improved apparatus for rerounding such pipes.

When flexible pipes or conduits such as, for instance, plastic water or sewer pipes are buried, the pipes may be deflected over time by the weight of the backfill material. The amount of deflection depends, among other factors, on the type of soil, the density of the soil, the placement of the pipe in the soil and the moisture content of the soil. Government regulations have been promulgated which define the maximum allowable deformation of the internal diameter of such pipes. Historically, when such deflection was detected, the pipes had to be dug up and the bedding material along the sides of the pipes and under the haunches of the pipes had to be recompacted and the entire trench had to be backfilled. This procedure was expensive, time consuming, and disruptive. Furthermore, this procedure did not insure that the deflection problem would not occur again.

Prior art devices have been provided to reround such deflected pipes in situ. In my prior patent, U.S. Pat. No. 4,309,128, the specification of which is incorporated herein by reference, an apparatus is disclosed comprising a cylindrical shell having a diameter which is slightly less than the diameter of the pipe to be rerounded. An air motor is mounted inside the shell for driving a vibrator. The entire apparatus is pulled through a pipe and the air motor is operated to cause vibrations to be set up in the apparatus for compacting the backfill. Deflected pipes may therefore be rerounded in situ, thus eliminating the necessity to dig up such deflected pipes and saving considerable expense and time.

One problem with the prior art devices is that insufficient horsepower is developed by the air motor. It is, of course, preferable that a substantial amount of horsepower is developed with a relatively compact air motor whereby substantial compaction of the backfill may take place. In the prior art device disclosed in U.S. Pat. No. 4,309,128, a commercial air motor was used to drive the crankshaft of the apparatus. While the rerounding device worked satisfactorily for many applications, this commercial air motor did not deliver as much horsepower as desired.

Another problem with the prior art rerounding devices has been that standard commercial air motors were designed only for intermittent operation and not for a continuous operation. It is desirable in the operation of rerounding devices to continuously operate the air motor as the rerounder is pulled through a considerable length of conduit. However, if the prior art air motors were operated continuously, the life of such air motors was substantially limited because of wear. Such wear is due to the high speeds at which air motors operate, the materials used in prior art air motors and furthermore, corrosion due to the environment in which the rerounding devices are operated. Corrosion is especially a problem in the use of the rerounding devices in coastal areas where the salt and humidity content of the air are particularly high.

A further problem with prior art rerounding devices was that adequate lubrication of the crankshaft bearings of the rerounder was difficult to accomplish. In particular, since the air which was expelled from the air motor was exhausted from the end of the rerounding device which is opposite to the end of the rerounding device at which the air motor was located, pressures would be set up in the rerounding device which would blow the lubrication out of the bearings and therefore leave the bearings inadequately lubricated. Since the crankshaft of the rerounding device rotates at approximately 4,000–5,000 RPM, and due to the presence of substantial levels of moisture in compressed air, lubrication of the bearings is crucial during continuous operation of rerounding devices. In the prior art rerounding devices disclosed in U.S. Pat. No. 4,309,128, the cavity of the rerounding device was about ⅓ filled with oil for lubricating the bearings whereby air pressure differences did not affect lubrication. However, it is desired to eliminate the need to fill the cavity of the rerounding device with oil.

A yet further problem with the prior art rerounding devices was that heat generated in the crankshaft bearings was not adequately dissipated, thus causing the bearings to heat up substantially and reducing the life thereof. The bearing heating problem was made worse by the fact that compressed air used by the air motor is at a considerably higher temperature than the ambient air, thus adding further to the bearing heating problem.

It is therefore desired to provide an improved rerounding apparatus having a compact and efficient air motor which is adapted to operate continuously. It is furthermore desired to provide an improved rerounding apparatus having an improved crankshaft bearing structure wherein the bearings are cooled by the air exhausted from the air motor and wherein the heat generated in the bearings is further dissipated from the bearings through the bearing support structure.

A yet further object of the present invention is to provide an improved rerounding apparatus including structure to equalize pressures across the crankshaft bearings in order to prevent lubricant from being blown out of the bearings.

SUMMARY OF THE INVENTION

The present invention, in one form thereof, overcomes the disadvantages of the above described prior art rerounding devices by providing an improved rerounding apparatus therefor. The rerounding apparatus of the present invention comprises a housing, at least one bearing mounted in the housing and a crankshaft journalled in the bearing. An eccentric is connected to the crankshaft to generate vibrations as the crankshaft rotates. An air motor is mounted in the housing to rotatably drive the crankshaft. The crankshaft includes an axial bore and at least one radial passage which is in fluid flow communication with the axial bore. The radial passage is so arranged that the crankshaft bearing is located axially intermediate the radial passage and the air motor whereby pressure equalization will be effected across the bearing. The apparatus further includes at least one radially extending flange around the bearing. The flange includes apertures therein whereby air which is expelled from the air motor may flow around the flange and cool the flange to dissipate heat generated in the bearing.

The present invention, in one form thereof, includes a generally cylindrical housing having bearings mounted therein for rotatably journalling a crankshaft. The crankshaft has an eccentric mounted thereon so that, when the crankshaft rotates, vibrations will be set up in the crankshaft and will be transmitted through the bearings to the housing. An air motor is mounted at one end of the rerounder and includes a stationary stainless steel cylinder within which a brass rotor is mounted on the end of the crankshaft. The rotor includes a plurality of slots in which vanes are slideably received. The rotor is eccentrically arranged within the cylinder. A nylon disc secured to one end of the cylinder serves as a bearing surface for the rotor and seals the cylinder. The crankshaft has an axial bore arranged therein. Radial passages are arranged in the crankshaft in fluid flow communication with the axial bore, whereby compressed air may flow through the axial bore and the radial passages to the opposite sides of the bearings, thereby providing pressure equalization across the bearings and preventing lubrication from being blown out of the bearings.

One advantage of the present invention is that the life of the rerounding apparatus is extended as compared to prior art rerounding devices.

Another advantage of the present invention is that the rerounding apparatus may be operated continuously for longer periods of time than prior art rerounding devices.

A still further advantage of the present invention is that in a corrosive environment, the rerounding apparatus is less subject to wear and corrosion than prior art rerounding devices and therefore has an extended life.

Yet another advantage of the present invention is that the air motor for a given size of rerounding apparatus can develop considerably more horsepower than was possible with prior art rerounding devices.

The present invention, in one form thereof, comprises an apparatus for rerounding flexible water, sewer or other buried pipes in situ. The apparatus includes a housing having a substantially cylindrical portion with an outside diameter slightly less than the inside diameter of a pipe to be rerounded. The housing includes an inlet for admitting compressed air and further includes at least one bearing mounted in the housing. A crankshaft is journalled in the bearing and has an eccentric mounted thereon to generate vibrations in the crankshaft when the crankshaft is rotated. An air motor is also mounted in the housing and is secured to the crankshaft for rotating the crankshaft. The crankshaft has an axial bore and at least one radial passage in fluid flow communication therewith. The bearing is intermediate the radial passage and the air motor so that the air pressure on both sides of the bearings is substantially equal.

The present invention, in one form thereof, provides an apparatus for rerounding flexible buried conduits in situ by drawing the apparatus through the conduit while vibrating the apparatus. The apparatus includes a generally cylindrical housing having an outside diameter which is slightly less than the inside diameter of the conduit to be rerounded. The housing has a plurality of bearings mounted therein and a crankshaft journalled in the bearings. A weight is eccentrically mounted on the crankshaft so that vibrations are induced in the crankshaft upon rotation of the crankshaft. An air motor drives the crankshaft and includes a cylinder, first and second end plates for the cylinder, a slotted rotor eccentrically mounted in the cylinder and secured to the crankshaft, and a plurality of vanes slideably received in slots of the rotor. The first end plate has at least one aperture therein to admit compressed air into the cylinder. The second end plate also has at least one aperture therein to expel air from the cylinder. The crankshaft includes a bore and at least one radial passage in fluid flow communication therewith. The radial passage is axially separated from the rotor by at least one of the bearings so that air pressure is equalized across at least one bearing.

The present invention, in one form thereof, provides an apparatus for restoring the diameter of deflected buried pipes substantially to their original shape in situ. The apparatus includes a housing, a compressed air inlet into the housing, an air outlet for the housing, and an air motor including a rotor located in the housing. The crankshaft is secured to the rotor and is driven thereby. At least one bearing is mounted in the housing for journalling the crankshaft. Means is provided in the crankshaft to equalize the air pressure across the bearing. An aperture is provided to admit air axially into the motor and another aperture is provided to expel air axially from the motor in the axial opposite direction from the admitting aperture.

It is an object of the present invention to provide an improved rerounding apparatus which has a longer life than prior art rerounding devices and is less subject to wear and corrosion.

It is a another object of the present invention to provide a compact efficient rerounding apparatus wherein the air motor is able to provide more horsepower for a given size of rerounding apparatus than was possible with prior art rerounding devices.

It is a further object of the present invention to provide an improved rerounding apparatus wherein proper lubrication of the crankshaft bearings is maintained during operation.

It is a still a further object of the present invention to provide a rerounding apparatus which may operate under continuous duty for longer periods than prior art rerounding devices.

It is yet a further object of the present invention to provide a rerounding apparatus wherein heat is dissipated from the bearings by means of a novel air flow arrangement through the rerounding apparatus and by means of specially arranged thermal energy conducting paths.

BRIEF DESCRIPTION OF THE DRAWINGS

The above mentioned and other features and objects of this invention and the manner of attaining them will become more apparent and the invention itself will be better understood by reference to the following description of an embodiment of the invention taken in conjunction with the accompanying drawings wherein.

Corresponding reference characters indicate corresponding parts throughout the several views of the drawings.

The exemplifications set out set out herein illustrate a preferred embodiment of the invention, in one form thereof, and such exemplifications are not to be construed as limiting the scope of the disclosure or the scope of the invention in any manner.

DESCRIPTION OF THE PREFERRED EMBODIMENT

Figure 1:
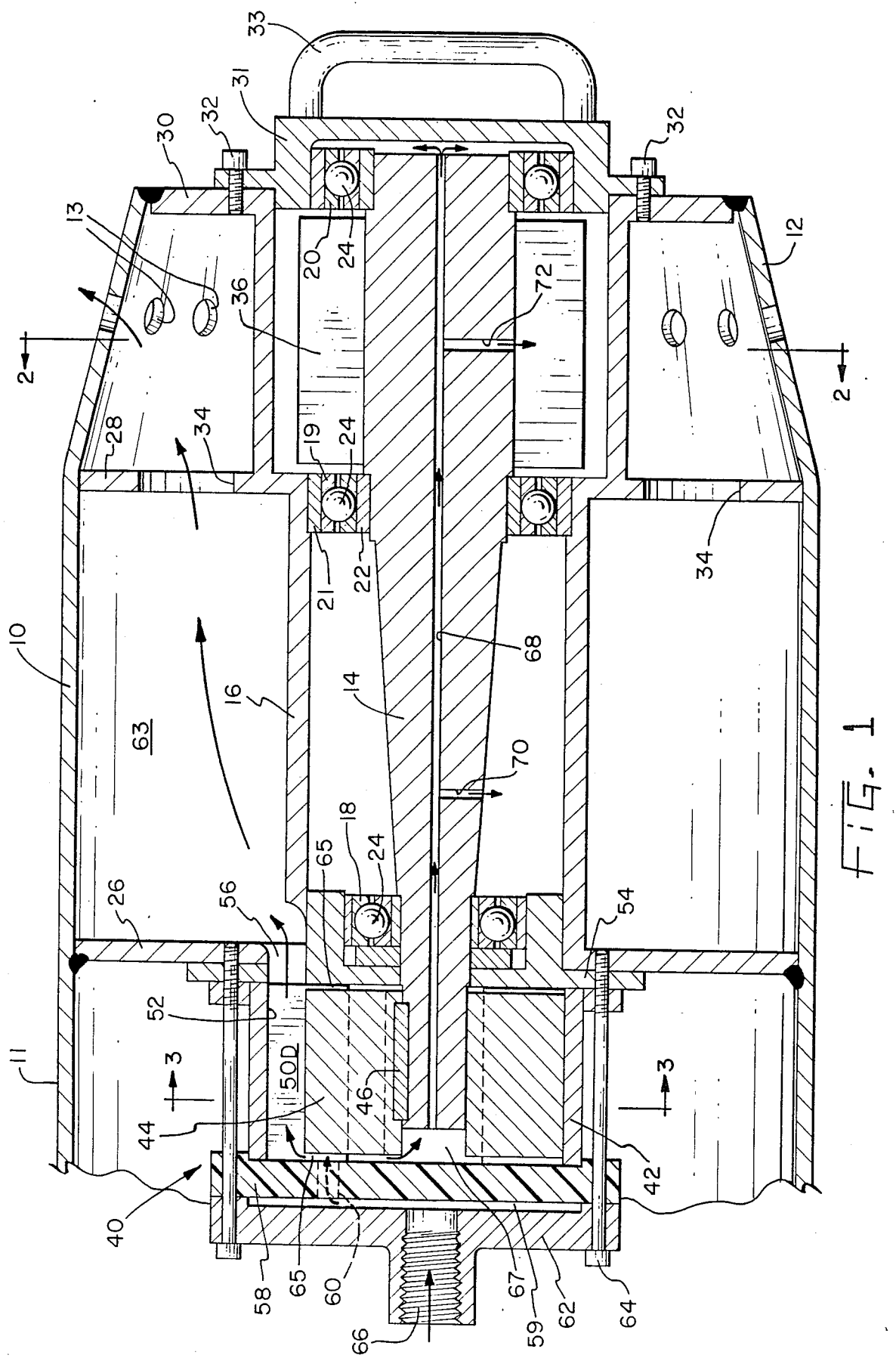
FIG. 1 is an elevational view in crosssection of a rerounding apparatus according to the present invention.
Figure 2:
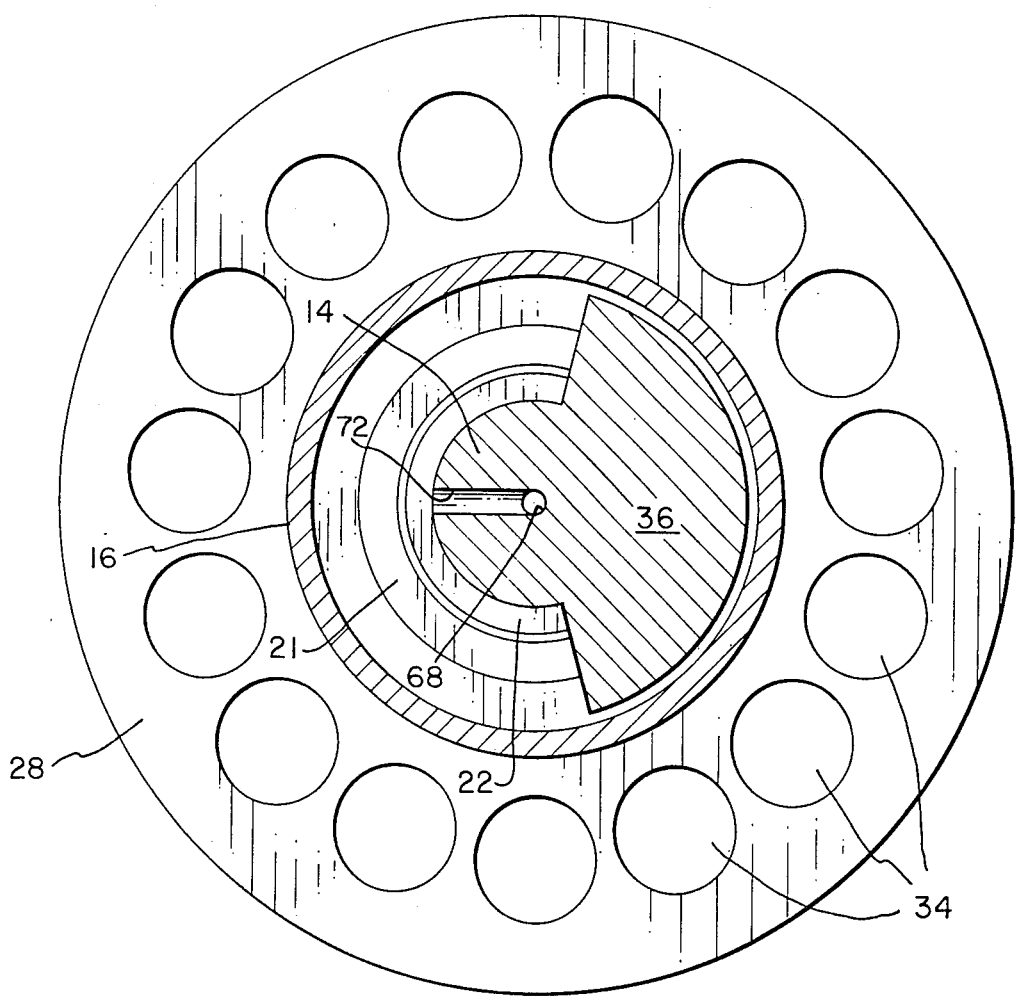
FIG. 2 is a cross-sectional view of the rerounding apparatus taken along lines 2—2 of FIG. 1.
Figure 5:
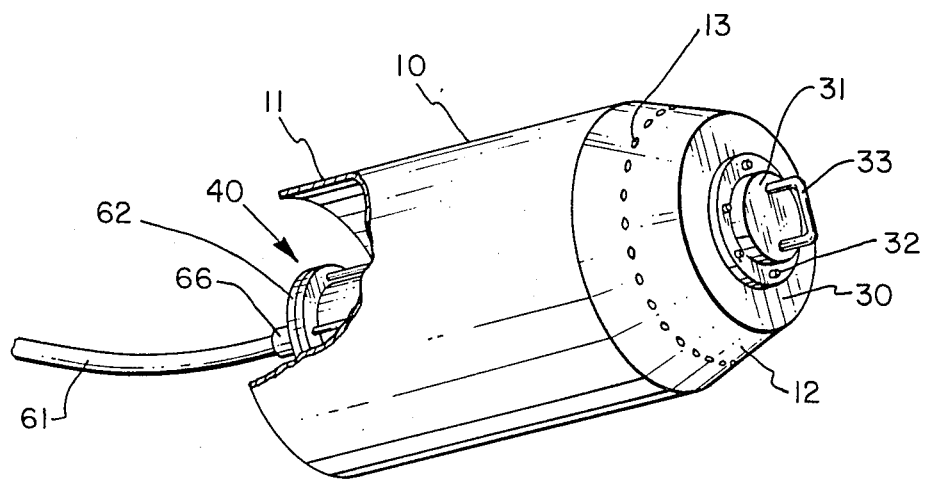
FIG. 5 is a perspective view of the rerounding apparatus of FIG. 1.

Referring now to FIGS. 1 and 5, there is shown a rerounding apparatus having a housing 10 in which a crankshaft 14 is rotatably journalled. The housing has a frustoconical front section 12 having aperture 13 therein. Housing 10 also has a skirt portion 11. A sleeve 16 is arranged in the housing in which three bearings 18, 19 and 20 are mounted. The bearings each include an outer race 21 and an inner race 22 between which are disposed a plurality of bearing balls 24. Flanges 26, 28 and 30 respectively surrounding bearings 18, 19 and 20. These flanges are secured to housing 10 and sleeve 16 such as for instance by welding or the like. Flange 30 has secured thereto an end cap 31 by means of a plurality of bolts 32. End cap 31 has secured thereto a handle 33 for attachment to a cable for pulling the rerounding apparatus through a pipe or conduit. The central flange 28 includes a plurality of apertures 34 as best seen in FIG. 2 for purposes further explained hereinafter. Crankshaft 14 is journalled in bearings 18, 19 and 20 as best seen in FIG. 1. Crankshaft 14 has mounted thereon an eccentric 36 comprising a substantial mass of material whereby, when the crankshaft is rotated at a high speed, vibrations will be set up in crankshaft 14, which vibrations will be transferred to bearings 18, 19 and 20 and thence through flanges 26, 28 and 30 to housing 10. Housing 10 transmits these vibrations to the backfill material around the pipe, thereby compacting the backfill material and enabling the deflection in the pipe to be eliminated as the rerounding apparatus 10 is pulled through the pipe. It should, of course, be noted that the outer diameter of rerounding apparatus 10 is only slightly less than the inside diameter of the pipe to be rerounded.

Figure 3:
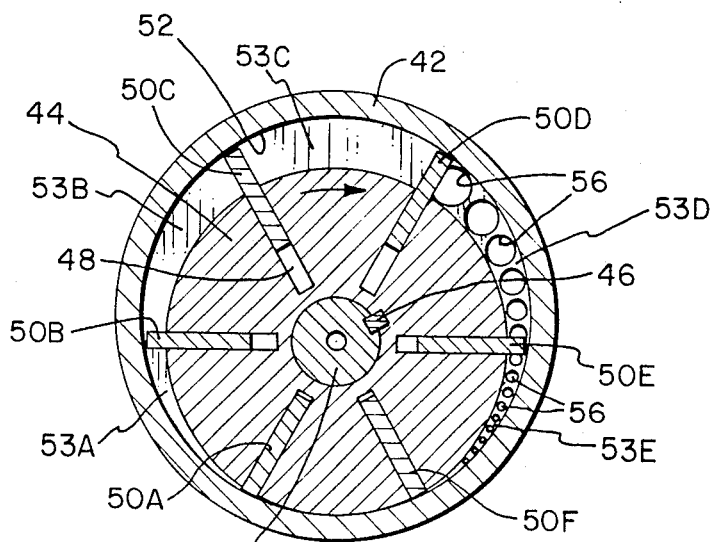
FIG. 3 is a cross-sectional view of the rerounding apparatus taken along lines 3—3 of FIG. 1.
Figure 4:
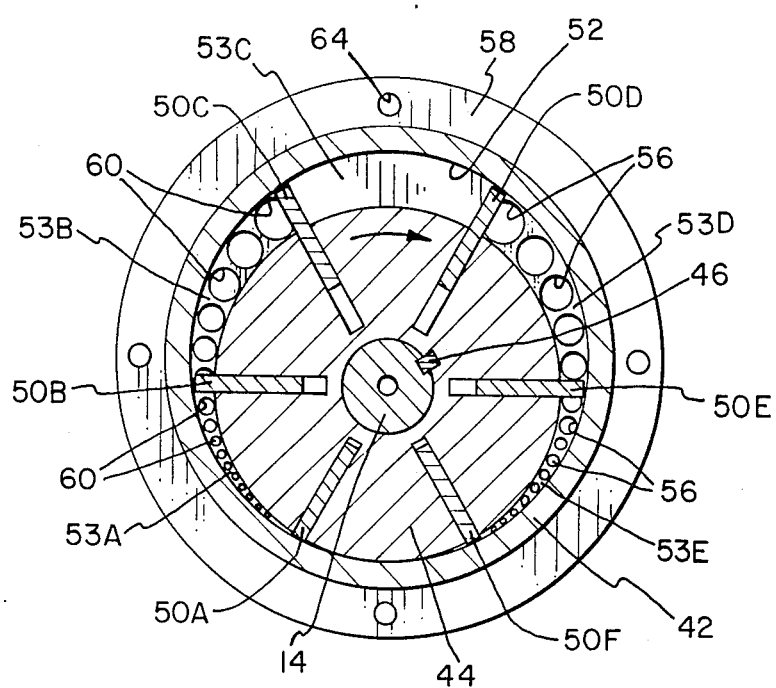
FIG. 4 is a schematic view of the rerounding apparatus of FIG. 1 showing the relationship of air inlet holes to the air outlet holes of the air motor.

Referring now to FIGS. 1, 3 and 4, an air motor 40 includes a cylinder 42. Cylinder 42 is preferably formed of stainless steel material to prevent corrosion of the cylinder, especially in corrosive environments such as in coastal areas. Since the air motor operates on compressed air, a substantial amount of humidity is normally present in the air motor, especially in humid environments such as encountered in semi-tropical coastal areas such as Florida. Furthermore, in coastal areas near the ocean, there will be a substantial amount of salt present in the air which also tends to cause corrosion if care were not taken in selecting special non-corrodible materials for air motor 40. Air motor 40 further includes a rotor 44 which is preferably made of brass. Air motor 44 is eccentrically mounted in cylinder 42 as best seen in FIG. 3. Rotor 44 is secured to crankshaft 14 by means of a key 46 whereby the rotor rotatably drives crankshaft 14.

Rotor 44 also includes a plurality of slots 48 in which are slideably disposed a plurality of vanes 50. Vanes 50 are preferably constructed of a light weight, non-corrodible material. In the preferred embodiment, the vanes are made of phenolic fibreboard which is an insulating material used for electrical circuit boards and the like. However, any other suitable non-corrodible material may be used for vanes 50.

As best seen in FIG. 3 and 4, vanes 50 slide outwardly under centrifugal force into contact with the inner wall 52 of cylinder 42. Rotor 44 rotates at considerable speeds such as for instance 4,000-5,000 RPM, so that centrifugal force ensures that vanes 50 are in intimate sliding contact with the inner wall 52 of cylinder 42. Clearance between the vanes and cylinder wall, in a preferred embodiment is two thousandths (0.002) of an inch. As best seen in FIG. 3, the off center location of rotor 44 with respect to cylinder 42 generates a space 53 between rotor 44 and the inner wall 52 of cylinder 42. Vanes 50 divide space 53 into compartments. By introducing compressed air into the first of these compartments 53A between vanes 50a and 50b as seen in FIG. 3, the compressed air will generate a force on vane 50b tending to rotate the vane in the clockwise direction and thereby carrying rotor 44 along with it. Thus, the pocket of compressed air 53a will travel along and become enlarged as the distance between the outer surface of rotor 44 and the inner wall 52 of cylinder 42 increases. The portion of travel of the rotor 44 between the position of vane 50c and 50d is the power portion of travel of rotor 44. During the power portion of travel of rotor 44, the air cannot escape as no exhaust apertures in rear end wall 54 are available to the pocket of compressed air as shown in FIG. 4. When vane 50d reaches the position of the first aperture 56 in the rear end wall 54, the air will be expelled from the pocket and will continue to be expelled as the rotor rotates further due to the series of apertures 56 in end wall 54. Thus the compressed air in compartments 53b, 53c and 53d may exit through the apertures 56 in rear end wall 54. Air is continually supplied to the air motor as new compartments 53 present themselves to air inlet apertures 60 in front end wall 58. Air is supplied through a supply hose 61, aperture 66 in end cap 62, a space 59, and apertures 60 in front end wall 58.

A typical compressed air pressure for operating the rerounding apparatus is approximately 125 PSI. As explained hereinabove, as rotor 44 rotates crankshaft 14 will rotate along with it thereby causing centrifugal weight 36 to be rotated and generating vibrations in the crankshaft. The vibrations are transmitted through the bearings 18, 19, 20, sleeve 16 and flanges 26-30 to housing 10.

Air is expelled through openings 56 in the rear end wall 54 into space 63 located between sleeve 16 and housing 10. Thus the air is expelled at the rear side of air motor 40 and will then travel axially through the rerounding apparatus. Air exits the rerounding apparatus through apertures 13 in housing 10. The air, as it travels through housing 10, will cool the metal surfaces around bearings 18, 19 and 20 and will also cool sleeve 16 which conducts heat away from the bearings. Further, the air contacts flanges 28 and travels through apertures 34 therein, thereby absorbing heat from flange 28 and carrying heat away from bearing 19. After exiting through apertures 34, the air continues to flow axially through the rerounding apparatus and absorbs heat from sleeve 16 and flange 30. Air then exits from the rerounder through apertures 13 in housing 10. Thus the expelled air from air motor 40 performs the function of helping to cool the rerounding apparatus. Considerable heat is generated in bearings 18, 19 and 20 of the rerounding apparatus because of the rotation of crankshaft 14 at very high speeds. Flanges 26, 28 and 30 also serve to cool the bearings and conduct heat away from the bearings to housing 10 of the rerounding apparatus. Housing 10 will be cooled by contact with the wall of the pipe to be rerounded.

End wall 58 is preferably constructed of a tough, resilient material such as nylon or other suitable plastic material. If stainless steel or some other metal were used for end plate 58, galling might occur between brass rotor 44 and end plate 58. Rear end wall 54 is preferably constructed of stainless steel.

Referring further to FIG. 1, the air motor front end wall 58 is spaced slightly away from rotor 44 by space 65 to compensate for temperature expansion of the parts and which may measure, for instance, five thousandth (0.005) inch. The same clearance space is provided between rotor 44 and rear end wall 54. Compressed air will therefore be able to flow through leakage paths 65 and enter cavity 67 located between the front face of crankshaft 14 and front end wall 58. In prior art rerounding devices, leakage through these paths created pressure on only one side of bearings 18, 19 and 20 as viewed in FIG. 1 and caused lubricant to be blown out of these bearings. In the present embodiment, an axial bore 68 through the crankshaft is provided together with radial passages 70 and 72 whereby air may flow from compartment 67 through axial bore 68 and radial passages 70 and 72 so that equal pressure is presented on both sides of each bearing 18, 19 and 20. Thus, when the rerounder is operating, equal air pressure will exist across each bearing, thereby preventing lubricant from being blown out of the bearings. Furthermore, when the rerounding apparatus is shut off, pressure which has built up on both sides of the bearings will not tend to leak back through the bearings and remove lubricant from the bearings, as the air can escape back to the air inlet through passages 70, 72 and bore 68.

While this invention has been described as having a preferred design, it will be understood that it is capable of further modification. This application is therefore intended to cover any variations, uses, or adaptations of the invention following the general principles thereof and including such departures from the present disclosure as come within known or customary practice in the art to which this invention pertains and fall within the limits of the appended claims.

What is claimed is:

1. An apparatus for rerounding flexible water, sewer or other buried pipes in situ comprising;
   a housing having a substantially cylindrical portion with an outside diameter slightly less than the the inside diameter of a pipe to be rerounded;
   an inlet for admitting compressed air into said housing;
   at least one bearing operably arranged in said housing;
   a crankshaft journalled in said bearing;
   an eccentric mounted on said crankshaft to generate vibrations in said crankshaft when said crankshaft is rotated;
   an air motor operatively mounted in said housing for rotatably driving said crankshaft;
   an axial bore in said crankshaft;
   at least one radial passage in said crankshaft in fluid flow communication with said axial bore, said bearing being axially intermediate said radial passage and said air motor whereby the air pressure on both sides of said bearing is substantially equal.

2. The apparatus according to claim 1 including a plurality of bearings arranged in said housing for journalling such crankshaft, and a plurality of radial passages in fluid flow communication with said axial bore, said plurality of radial passages axially alternatingly arranged with said plurality of bearings, whereby the air pressure across said bearings is equalized.

3. The apparatus according to claim 1 including a circular flange coaxially arranged substantially around said bearing for conducting heat energy from said bearing to said housing.

4. The apparatus according to claim 3 wherein said flange includes a plurality of apertures through which air which is expelled from said air motor may flow, thereby cooling both said flange and said bearing.

5. The apparatus according to claim 1 wherein said air motor includes a rotor, a cylindrical casing surrounding said rotor and having its axis abaxially oriented with respect to said rotor axis, front and rear end plates for said casing to define an operating bore for said rotor, means for admitting air into said bore, and at least one aperture in said rear end plate for enabling air to be expelled from said bore.

6. The apparatus according to claim 5 wherein said front end plate includes at least one aperture for admitting compressed air to said bore.

7. The apparatus according to claim 5 wherein said front end plate is composed of a plastic material.

8. An apparatus for rerounding flexible buried conduits in situ by drawing said apparatus through a conduit while vibrating said apparatus, said apparatus comprising:
   a generally cylindrical housing having an outside diameter slightly less than the inside diameter of a conduit to be rerounded;
   a plurality of bearings mounted in said housing;
   a crankshaft journalled in said bearings;
   a weight eccentrically mounted on said crankshaft for inducing vibrations in said crankshaft upon rotation of said crankshaft;
   an air motor for rotatably driving said crankshaft and including a cylinder, first and second end plates for said cylinder, a slotted rotor eccentrically disposed in said cylinder and secured to said crankshaft and a plurality of vanes slidingly received in slots of said rotor;
   at least one aperture in said first end plate for admitting compressed air into said cylinder;
   at least one aperture in said second end plate for expelling air from said cylinder;
   a bore in said crankshaft;
   at least one radial passage in said crankshaft in fluid flow communication with said bore, said radial passage being axially separated from said rotor by at least one of said bearings, whereby air pressure is equalized across said at least one bearing.

9. The apparatus according to claim 8 including a circular flange coaxially arranged around said bearing for conducting heat energy from said bearing to said housing.

10. The apparatus according to claim 9 wherein said flange includes a plurality of apertures for establishing a flow path for air expelled from said air motor, thereby cooling said plate and said bearing.

11. The apparatus according to claim 8 wherein first end plate is composed of a plastic material.

12. The apparatus according to claim 8 wherein said rotor is made of brass.

13. The apparatus according to claim 8 wherein said casing is made of stainless steel.

14. The apparatus according to claim 8 wherein said vanes are made of phenolic fiberboard.

15. An apparatus for restoring the diameter of a deflected buried pipe substantially to its original shape, in situ, said apparatus comprising:

a housing;

a compressed air inlet into said housing;

an air outlet for said housing;

an air motor in said housing and including a rotor;

a crankshaft secured to said rotor and driven thereby;

at least one bearing in said housing for journalling said crankshaft;

means in said crankshaft for equalizing the air pressure across said bearing;

means for admitting air axially into said motor; and means for expelling air axially from said motor in the axial opposite direction from said admitting means.

16. The apparatus according to claim 15 wherein said air pressure equalizing means comprises an axial bore in said crankshaft and at least one radial passage in flow communication therewith for delivering compressed air to the side of said bearing which is axially farthest removed from said rotor.

17. The apparatus according to claim 15 including a circular plate coaxially arranged around said bearing for conduction heat energy from said bearing to said housing.

18. The apparatus according to claim 17 wherein said flange includes a plurality of apertures for conducting air therethrough which is expelled from said air motor, thereby cooling said flange and said bearing.

19. The apparatus according to claim 15 wherein said air motor includes a cylindrical casing which surrounds said rotor, said rotor being eccentrically mounted in said casing, front and rear end plates for defining the operating bore of said rotor, means for admitting air into said bore and at least one aperture in said rear end plate for expelling air from said bore.

20. The apparatus according to claim 19 wherein said front end plate includes at least one aperture for admitting compressed air into said bore.

* * * * *